July 26, 1938. D. L. WINTERS 2,124,900

DUAL BRAKE CONTROLLING MECHANISM FOR VEHICLES

Filed Nov. 2, 1936 2 Sheets-Sheet 1

INVENTOR
*David L. Winters*
BY
*Munn, Anderson & Liddy*
ATTORNEYS

July 26, 1938.  D. L. WINTERS  2,124,900

DUAL BRAKE CONTROLLING MECHANISM FOR VEHICLES

Filed Nov. 2, 1936  2 Sheets-Sheet 2

INVENTOR
David L. Winters
BY
ATTORNEYS

Patented July 26, 1938

2,124,900

UNITED STATES PATENT OFFICE 2,124,900

DUAL BRAKE CONTROLLING MECHANISM FOR VEHICLES

David L. Winters, Los Angeles, Calif.

Application November 2, 1936, Serial No. 108,735

7 Claims. (Cl. 188—152)

This invention relates generally to vehicles, and more particularly to hydraulic braking mechanisms as employed on automobiles.

An object of the invention is to provide a mechanism by which power can be applied directly to the fluid displacement device of the hydraulic braking system (specifically to the piston of the master cylinder) to effect and maintain a power application of the brakes of any desired intensity, all under the direct control of the operator.

Another object of the invention is to provide a mechanism by which the aforestated power application of the brakes can be supplemented by manual force imposed upon the piston of the master cylinder to increase the intensity of the brake application sufficiently to lock the wheels in an emergency; which is structurally characterized or rendered adjustable to prevent locking of the wheels by the power application of the brakes; and which enables a power application alone or a power application plus a manual application to be effected through the medium of the heel portion of an accelerator pedal in a manner to promote instantaneous operation and maximum convenience in controlling the speed of the vehicle.

A further object of the invention is to provide a brake control mechanism wherein means is embodied to insure the release of air and the removal of foreign substances from the brake fluid in the master cylinder, so as to reduce to a minimum wear on the working parts caused by foreign substances of an abrasive nature, with the attendant leakage of brake fluid past the piston of the master cylinder, and loss of fluid displacement by the piston.

A still further object of the invention is to provide means by which gas and oil vapors now being wasted through the engine breather, can be utilized in the operation of the engine in a manner to avoid leaning the mixture when the vacuum of the engine is used as a source of power to apply the brakes, thus obviating the necessity for further enriching the mixture to compensate for the additional air admitted to the engine, whereby to insure dependable idling operation of the engine without further sacrifice of economy.

With these and other objects in view, the invention consists in the combinations, arrangements and functional relationships of elements as set forth in the following specification and particularly pointed out in the appended claims.

In the accompanying drawings.

Figure 2:
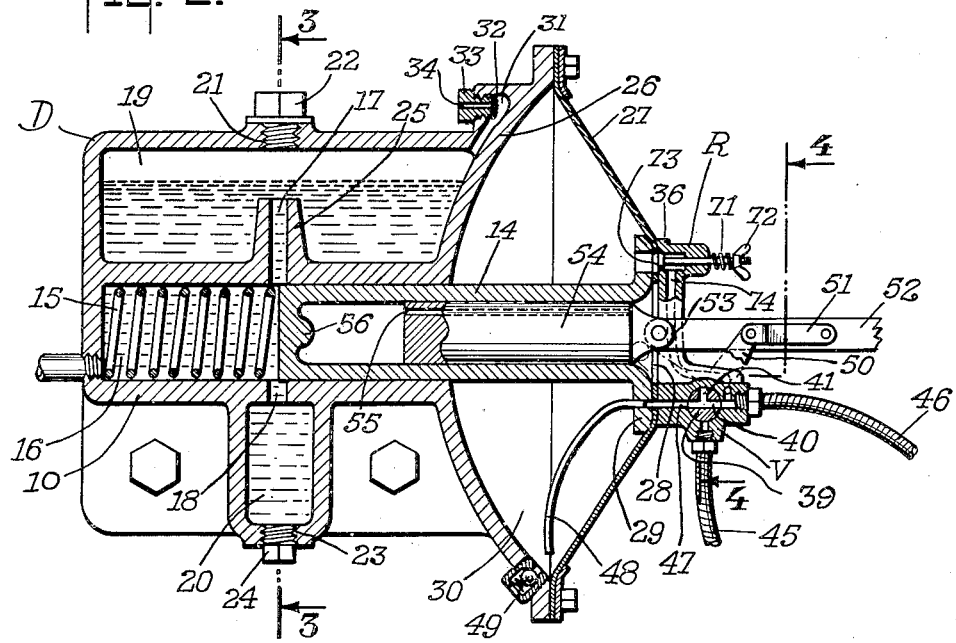
Figure 2 is an enlarged longitudinal central sectional view of the master fluid displacement device embodied in the invention.
Figure 5:
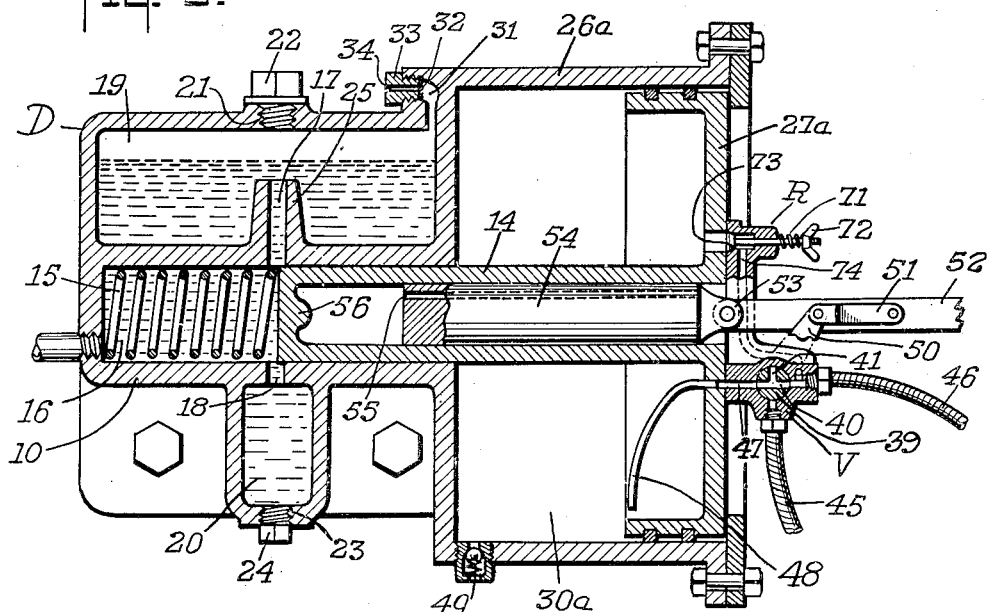

Figures 3 and 4 are transverse sectional views taken, respectively, on the lines 3—3 and 4—4 of Figure 2;

Figure 5 is a view similar to Figure 2 and illustrating a slightly modified form of fluid displacement device.

Figure 1:
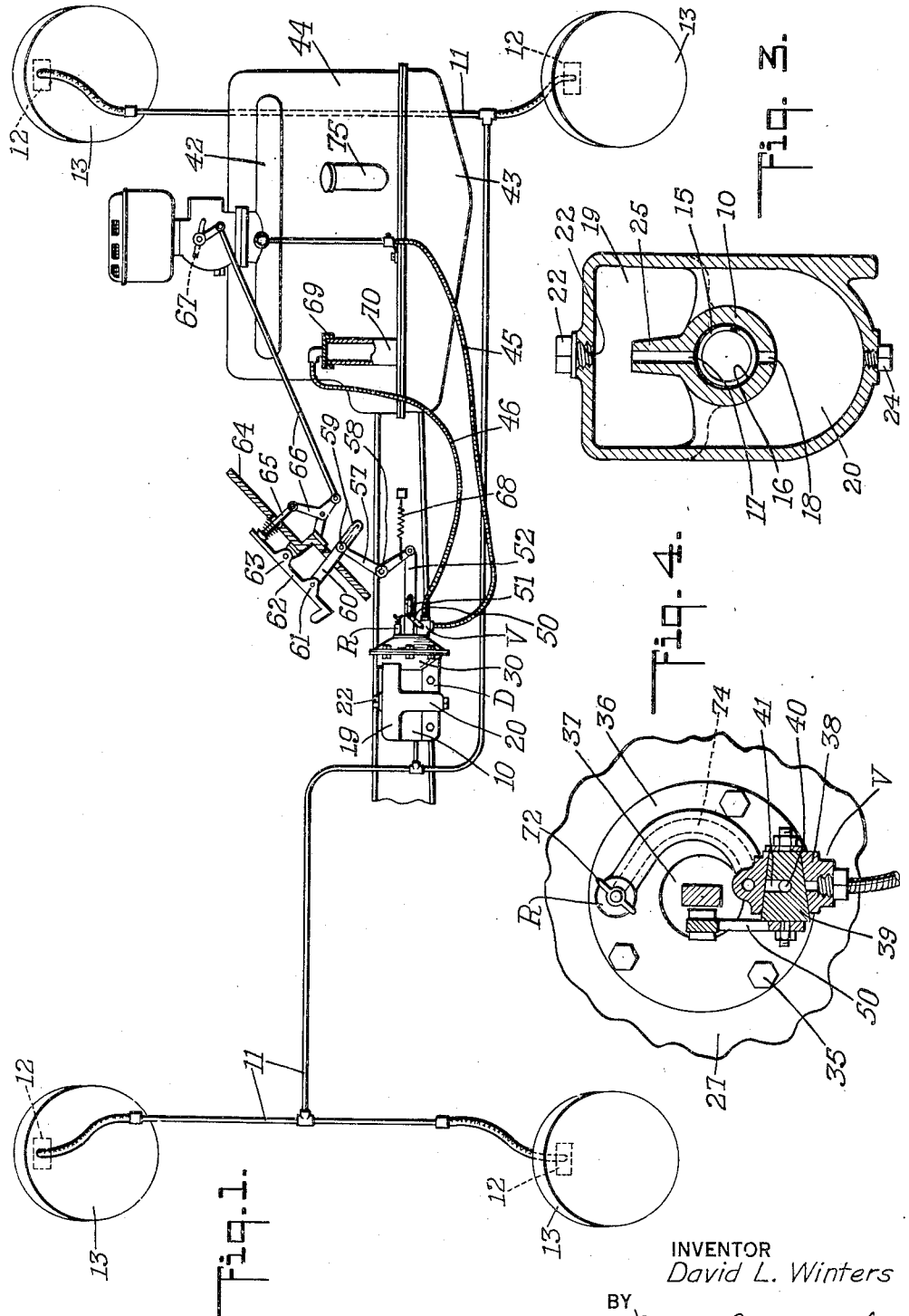
Figure 1 is a semi-diagrammatic view illustrating the dual brake controlling mechanism embodying this invention applied to the hydraulic braking system and engine of an automobile.

Referring specifically to Figures 1 to 3, inclusive, the invention in its present embodiment comprises a master fluid displacement device D which constitutes the master cylinder of a hydraulic braking mechanism.

The device D comprises a cylinder 10 which is suitably supported in a horizontal position from the chassis frame of the vehicle. From one closed end of the cylinder lead the usual fluid tubes 11 to the wheel cylinders 12 at the brakes 13 of the vehicle, all as shown in Figure 1.

Working in the cylinder 10 is a hollow piston 14 normally urged to one extreme position by a spring 15 disposed in the working chamber 16 of the cylinder which in the released position of the brakes shown in Figure 2 is placed in communication by diametrically opposed upper and lower ports 17 and 18, with a fluid reservoir 19 extending above the cylinder along the full length thereof, and around the cylinder to a point below the latter to form a sediment trap 20.

Fluid is adapted to be supplied to the reservoir 19 through a filling opening 21 in the top wall thereof closed by a removable plug 22, and sediment collecting in the trap 20 is adapted to be removed therefrom through a drain opening 23 closed by a removable plug 24. The port 17 which is in the form of a vertical duct, extends through a vertical extension 25 from the cylinder 10 in the reservoir, so as to preclude the settling of foreign substances in the fluid directly through the port into the working chamber 16. The connection of the tubes 11 to the cylinder is at substantially the lowest level in the working chamber so that under the movements of the piston, the tendency of any foreign substances which collect in the working chamber from any source in the system, will be to discharge therefrom through the port 18 and thus settle out of the fluid into the trap 20.

The open end of the cylinder 10 is provided externally with a concavo-convex flange 26 forming one end wall of the reservoir 19 and having secured thereto around its marginal portion a flexible diaphragm 27 having a central opening 28. The inner portion of the diaphragm surrounding the opening 28 is secured to a flange 29 on the open end of the piston 14 which projects from the cylinder, so as to be centrally disposed in a suction chamber 30 surrounding the piston and defined by the diaphragm 27 and flange 26. At the juncture of the top wall of the reservoir and the flange 26 is a vent passage 31 communicating with the reservoir and spanned by a fine screen 32 secured in place by a plug 33 having a horizontally disposed vent duct 34, to the end of compensating for loss of fluid in the system by admitting air thereto, as well as permitting breathing of the system in response to movements of the piston 14.

The diaphragm 27 is secured by bolts 35 between the flanges 29 of the piston, and a circular plate 36 having a central opening 37 and formed integral with the body 38 of a brake control valve V having a rotatably mounted plug 39 therein provided with passages 40 and 41 by which the interior of the suction chamber 30 can be placed in communication with the intake manifold 42 or crankcase 43 of the vehicle's engine 44 through flexible pipes 45 and 46, respectively, and according as the valve occupies the one extreme position shown in full lines in Figure 2, or the other extreme position shown in broken lines in this figure. A passage 47 which leads from the plug 39 through the body 38, diaphragm 27 and flange 29 terminates in a length of flexible tubing 48 in the chamber 30, and this tubing extends to approximately the lowest point in the chamber. A spring loaded and outwardly opening check valve 49 is provided for the chamber to enable the latter to be relieved of pressure more rapidly than is possible by engine suction acting through the conduit 45, as will be more fully described in the operation of the invention.

To the plug 39 is secured an arm 50 connected by a short link 51 to a main link 52 one end of which is pivotally connected at 53 to a guide head 54 freely slidable in the piston 14 and having an air vent duct 55 extending therethrough. In the extreme position of the valve V, wherein the suction chamber 30 is placed in communication with the intake manifold 42, the closed end of the head 54 abuts a central projection 56 on the inner closed end of the piston so as to provide a rigid operative connection between the piston and link 52 in a direction to further advance the piston in the working chamber 16.

The other end of the link 52 is connected to one arm of a bell crank lever 57 pivoted on a fixed axis 58 and having a pin-and-slot connection 59 with a link 60 pivotally connected at 61 to the heel portion of an accelerator pedal 62. The pedal is rockably mounted intermediate its ends at 63 on the floor board 64 of the driver's compartment, and the toe portion of the pedal engages a headed and spring urged push rod 65 connected by suitable linkage 66 to the throttle valve 67 of the engine 44 so that as the pedal is rocked forwardly, the throttle valve will be opened. The valve V and pedal 62 are urged to the positions shown in Figure 2 by a relatively light spring 68 connected to the bell crank lever 57. By the provision of the pin-and-slot connection 59, it will be clear that the movements of the throttle valve can be effected independently of the power brake control valve V, and that movement of the latter by depressing the heel portion of the pedal 62 will not affect the throttle valve as the toe portion of the pedal will move away from the rod 65.

It will be noted that the pipe 46 through which the suction chamber 30 can be placed in communication with the crankcase 43 is connected to a cap 69 closing the upper end of a relatively large standpipe 70 supported on the engine with its lower end in direct communication with the interior of the crankcase so as to receive gas and oil vapors arising from the hot oil therein during operation of the engine. Thus only the more volatile products which do not condense on the walls of the standpipe will be conducted by the pipe 46 to the suction chamber 30 in a manner to be described more fully in the operation of the invention which is as follows:

With the parts occupying the positions shown in Figures 1 and 2, the brakes are fully released, and it will be clear that the accelerator pedal 62 can be operated to supply fuel to the engine 44 without affecting the braking mechanism.

However, when it is desired to apply the brakes, depressing the heel portion of the pedal 62 will, through the link 60, bell crank lever 57, and links 52 and 53, move the control valve V to its extreme position wherein the suction chamber 30 is placed in communication with the intake manifold 42. Thus the diaphragm 27 will be acted upon by the reduced pressure created in the chamber by the suction of the engine, to advance the piston 14 in its cylinder 10, thereby displacing fluid in the working chamber 16 and effecting a power brake application. As the piston 14 advances, it will be clear that unless depressing movement of the pedal is continued in time with the movement of the piston so as to maintain the control valve in this extreme position, that the valve V (which, of course, moves as a unit with the piston) will cause the plug 39 to reversely rotate with respect to the valve body 38 having the effect of disrupting communication between the intake manifold and the suction chamber so that movement of the piston will cease and the brakes thus be maintained applied to the extent determined by the position at which the pedal 62 is held depressed by the operator.

Therefore, it will be manifest that in accordance with the movement of the accelerator pedal 62, a power brake application of any desired intensity from a minimum to a maximum, can be effected and maintained. In order to prevent locking of the wheels by a power application of the brakes, which is intended for service use, the size of the diaphragm 27 can be precalculated, as the suction developed by the engine is constant under a closed throttle, or in lieu thereof a relief valve R can be provided. The valve is loaded by a spring 71, the loading of which can be varied by a thumb nut 72 threaded on the stem of the valve. The valve is mounted in an enlarged portion of the plate 36 and normally is urged by the spring 71 to close a port 73 so as to prevent the breaking of a vacuum in the chamber 30. However, the spring loading of the valve is such that when a maximum power brake application insufficient to lock the wheels is effected, the valve will open to allow air from the crankcase 43 to be drawn into the chamber 30 through a passage 74 formed in the plate 36 and communicating with the inlet of the body 38 to which the pipe 46 is connected. Thus locking of the wheels from a power application of the brakes will be prevented automatically regardless of the extent to which the pedal 62 is depressed.

Should the maximum power application of the brakes be insufficient in an emergency, for example, continued manual pressure on the pedal 62 when the piston has been fully advanced by power will cause the inner end of the head 54 to solidly abut the projection 56 on the piston 14, thus directly transmitting the manual energy to the piston and adding such energy to the vacuumatic power to lock the wheels.

By opening the suction chamber 30 to the crankcase of the engine rather than to the atmosphere, volatile vapors composed of gasoline and oil from the engine, which are at present discharged through the usual breather pipe 75 of the engine and thereby wasted, are utilized by being sucked into the chamber 30 when the brakes are released, and are withdrawn from the chamber into the intake manifold when the brakes are applied. These volatile vapors mix with the incoming charges of fuel in the intake manifold, from which it will be clear that the necessity for enriching the mixture to compensate for the additional air admitted to the engine will be obviated.

Should any vapors condense in the chamber 30, the condensate will collect in the bottom of the chamber and will be sucked from the chamber in response to a power brake application.

In the event of a sudden depression of the pedal 62, and with such rapidity that an attempt to apply the brakes manually by engagement of the inner end of the guide head 54 with the projection 56 would result before the engine suction could act in the chamber 30 or 30a through the small diameter pipe 45, a pressure would tend to build up in the chamber and react upon the diaphragm 27 or piston 27a, in retarding brake applying movement of the piston 14. Under these conditions, the excess pressure in the chamber would be relieved therefrom by the automatic opening of the check valve 49, thus facilitating an instantaneous application of the brakes in an emergency.

Reference will now be had to Figure 5, which illustrates a slightly modified form of the invention differing structurally from the form above described only to the extent that a relatively large piston 27a on the opening end of the piston 14 is substituted for the diaphragm 27 and works in a relatively large cylinder 26a substituted for the flange 26 on the cylinder 10 to define a suction chamber 30a. As the functioning and operation of this structure are identical to the previously described form, further description is deemed unnecessary.

It will also be manifest that pressure from a source higher than atmospheric pressure can be utilized to actuate the pressure responsive means (specifically the piston 14 of the cylinder 10).

What is claimed is:

1. In hydraulic brake controlling mechanism for motor vehicles, a fluid displacement device including a cylinder adapted for connection to fluid lines leading to the brakes; a fluid displacing piston in the cylinder having an abutment; fluid pressure responsive means co-acting with the piston and cylinder to effect brake applying movement of the piston when fluid power is applied to said means; a control valve mounted to move bodily with the piston and to be closed in response to brake applying movement of the piston; and manually operable means operatively connected to said valve to control said fluid responsive means in accordance with the movement of the piston so as to enable a brake application of any intensity from a minimum to a maximum to be effected and maintained; said manually operable means including a member extensibly associated with said piston to be inactive with respect thereto until a maximum power application of the brakes is reached, and co-acting with said abutment to directly operate the piston manually should actuation of the manually operable means be continued following a maximum power application of the brakes.

2. In hydraulic brake controlling mechanism for motor vehicles, a fluid displacement device including a cylinder adapted for connection to fluid lines leading to the brakes; a fluid displacing piston in the cylinder; fluid pressure responsive means in central engagement with the piston and in annular engagement with the cylinder for co-action therewith in effecting brake applying movement of the piston when fluid power is applied to said means; and means for limiting the fluid power capable of being applied to said piston to a predetermined maximum rendering a power brake application incapable of locking the wheels of the vehicle.

3. In hydraulic brake controlling mechanism for motor vehicles, a fluid displacement device including a cylinder adapted for connection to fluid lines leading to the brakes; a fluid displacing piston in the cylinder; fluid pressure responsive means in central engagement with the piston and in annular engagement with the cylinder for co-action therewith in effecting brake applying movement of the piston when fluid power is applied to said means; a control valve for the fluid pressure responsive means; means for limiting the fluid power capable of being applied to said piston by the fluid pressure responsive means, to a predetermined maximum rendering a power brake application incapable of locking the wheels of the vehicle; and manually operable means for controlling said valve, and by which the piston can be actuated.

4. In hydraulic brake controlling mechanism for motor vehicles, a fluid displacement device including a cylinder adapted for connection to fluid lines leading to the brakes; a fluid displacing piston in the cylinder; a fluid reservoir surrounding the cylinder and terminating in a sediment trap below the cylinder; means defining top and bottom ports in the cylinder, placing the latter in communication with the reservoir and with the sediment trap and means for actuating the piston to apply the brakes.

5. In a brake controlling mechanism for vehicles, a fluid displacement device including a horizontal cylinder adapted for connection to fluid lines leading to brakes, and having ports in its top and bottom walls; a fluid displacing piston in the cylinder, uncovering said ports in the brake releasing position of the piston; a fluid reservoir above the cylinder in communication therewith through said top port; and a sediment trap below the cylinder communicating therewith through said bottom port, and having a portion extending around at least one side of the cylinder in communication with the reservoir.

6. In a brake controlling mechanism for vehicles, a fluid displacement device including a cylinder adapted for connection to fluid lines leading to the brakes; a fluid displacing piston in the cylinder; a fluid reservoir above the cylinder; and a tubular extension on the cylinder projecting vertically upward into the reservoir and providing a fluid passage the upper end of which is remote from the bottom of the reservoir so that foreign substances in the reservoir fluid settling to the bottom of the reservoir will be prevented from entering the cylinder through said passage.

7. In a brake controlling mechanism, a fluid displacement device including a cylinder adapted for connection to a fluid line leading to a brake; a piston in the cylinder; a fluid reservoir above the cylinder; and means co-acting with the cylinder to define an inlet passage for fluid, the upper end of which is sufficiently remote from the bottom of the reservoir that foreign substances in the reservoir fluid settling to the bottom of the reservoir will be prevented from entering the cylinder through said passage.

DAVID L. WINTERS.